April 5, 1955            P. F. EPPLE            2,705,345
MANUFACTURE OF SLIDERS FOR SLIDE FASTENERS
Original Filed April 11, 1946            2 Sheets-Sheet 1
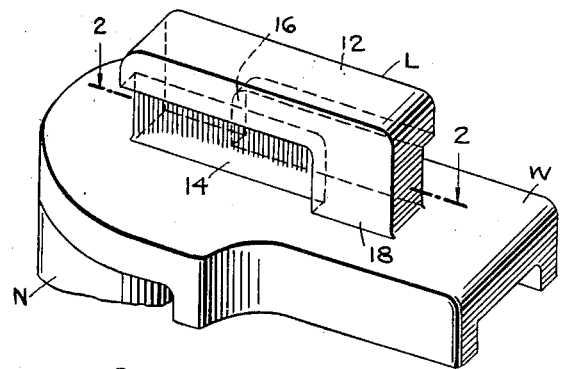
FIG.1
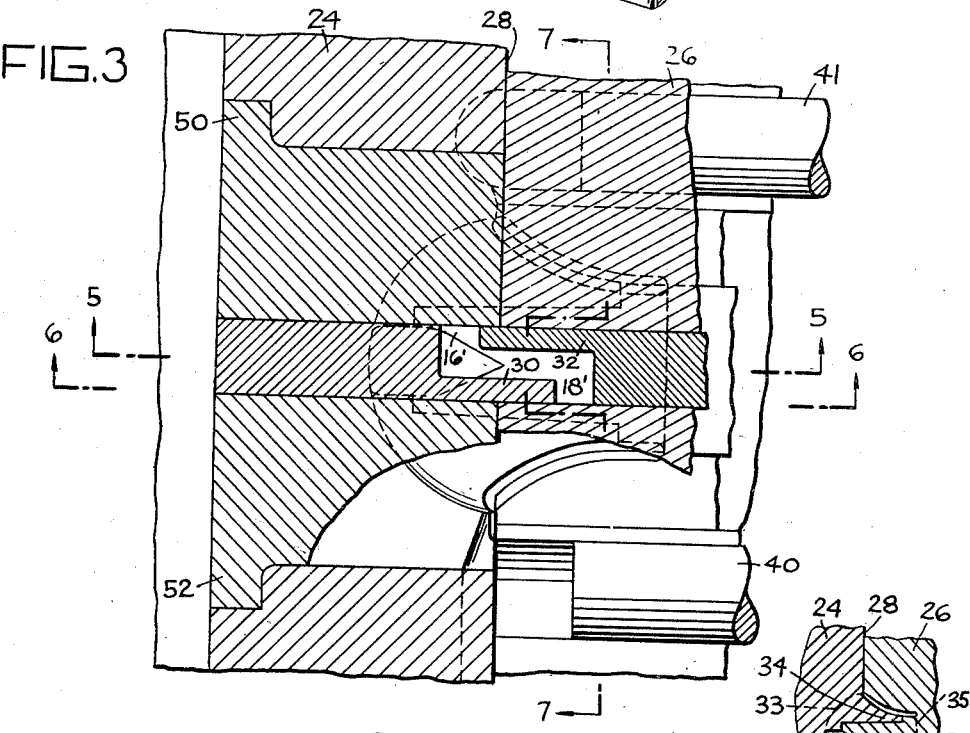
FIG.3
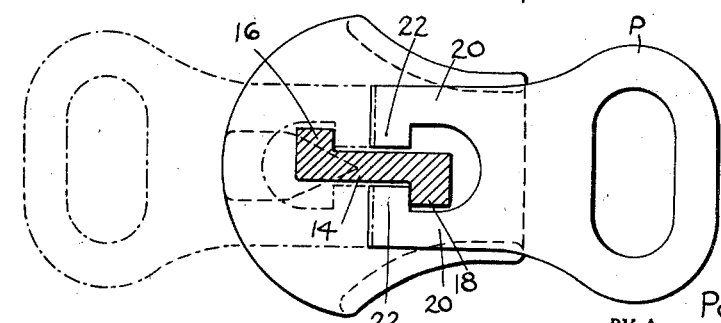
FIG.2
FIG.4
INVENTOR.
Paul F. Epple
BY James and Franklin
ATTORNEYS April 5, 1955 P. F. EPPLE 2,705,345
MANUFACTURE OF SLIDERS FOR SLIDE FASTENERS
Original Filed April 11, 1946 2 Sheets-Sheet 2
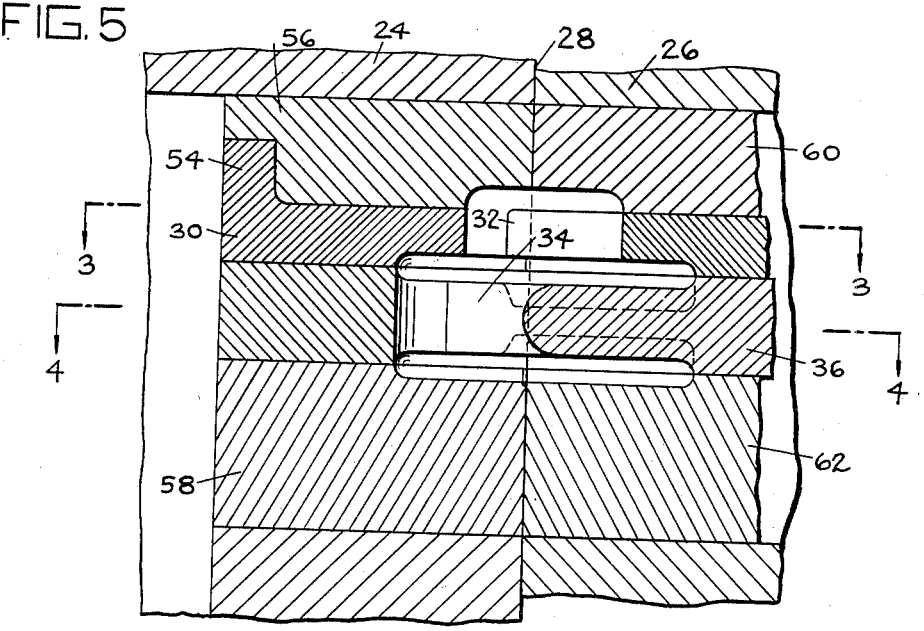
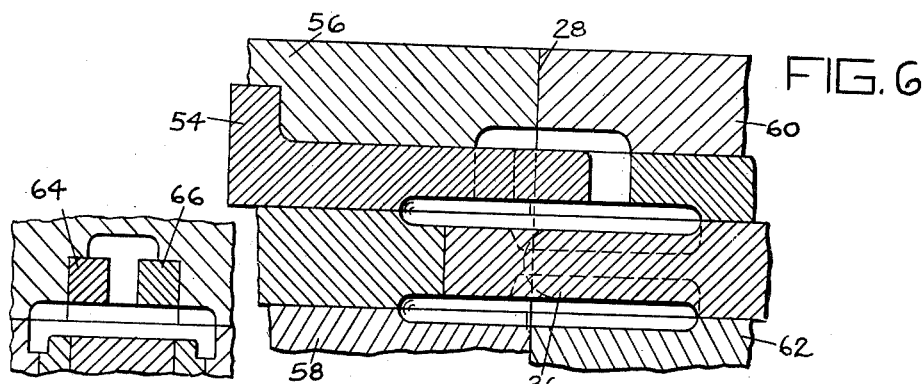
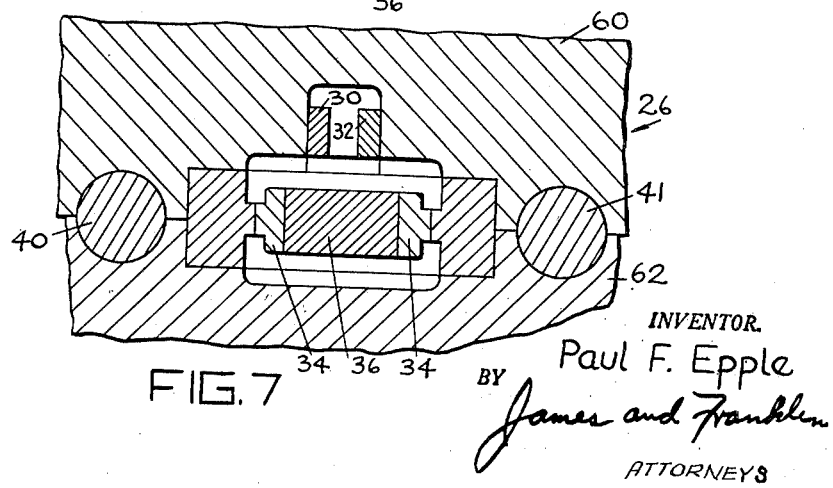
INVENTOR.
Paul F. Epple
BY James and Franklin
ATTORNEYS

United States Patent Office 2,705,345
Patented Apr. 5, 1955

2,705,345

MANUFACTURE OF SLIDERS FOR SLIDE FASTENERS

Paul F. Epple, Astoria, N. Y., assignor to Conmar Products Corporation, Newark, N. J., a corporation of New Jersey Original application April 11, 1946, Serial No. 661,252. Divided and this application October 20, 1951, Serial No. 252,245

2 Claims. (Cl. 18—42)

This invention relates to sliders for slide fasteners, and more particularly to molded sliders and apparatus for molding the same.

The conventional slider of a slide fastener comprises flanged wings spaced and joined by a neck or "diamond," the neck and flanges defining a Y-shaped slider channel for meshing or unmeshing the stringers of the fastener. The upper wing is usually provided with a lug for holding a pull tab or "pull" for operating the slider. One convenient way to make such a slider is by molding. In an effort to reduce the complexity of the mold by eliminating movable cores, it has been suggested in a co-pending application of Frederick Ulrich, Serial No. 512,898, filed December 4, 1943, now Patent No. 2,415,395 that the slider be molded in a mold the parting plane of which extends transversely of the longitudinal axis of the slider and across the widest dimension of the slider. The neck and the interior of the slider are defined by oppositely directed fixed cores which project through the mold cavities. The lug is a simple, solid, unfinished lug which must subsequently be drilled to provide an opening to receive the pull.

One object of the present invention is to eliminate the drilling operation, and to provide the slider with a finished lug, while still avoiding the use of movable cores.

This result has already been sought, and one solution is taught in a co-pending application of Paul Natzler, Serial No. 577,552, filed February 12, 1945, now Patent No. 2,487,359. An object of the present invention is to improve on the slider and molding apparatus disclosed in said application.

More specific objects are to provide a slider having a simpler and stronger lug which may be molded in a mold having simpler and stronger stationary cores.

To accomplish the foregoing general objects and other more specific objects which will hereinafter appear, my invention resides in the molded slider and the apparatus for molding the same, and their relation one to the other, as are hereinafter more particularly described in the following specification. The molded slider is not claimed herein, it being claimed in my co-pending application Serial No. 661,252, filed April 11, 1946, now Patent No. 2,615,225, of which the present application is a division. The specification is accompanied by drawings, in which:

Fig. 1 is a perspective view of the upper part of a slider embodying features of my invention, before adding the pull;

Fig. 2 is a partially sectioned plan view taken approximately in the plane of the line 2—2 of Fig. 1, with the pull added;

Fig. 3 is a section through a mold for making the slider shown in Figs. 1 and 2, this section being taken approximately in the plane of the line 3—3 of Fig. 5;

Fig. 4 is a schematic or simplified section drawn to reduced scale, and is taken approximately in the plane of the line 4—4 of Fig. 5;

Fig. 5 is a section through the mold, taken approximately in the plane of the line 5—5 of Fig. 3;

Fig. 6 is a section through the mold, taken approximately in the plane of the line 6—6 of Fig. 3;

Fig. 7 is a transverse section of the mold taken approximately in the planes of the stepped line 7—7 of Fig. 3; and Fig. 8 is explanatory of a modification.

Referring to the drawing, and more particularly to Figs. 1 and 2, the slider comprises flanged upper and lower wings W (the lower wing being omitted from the drawing to save space) joined by a neck N. The upper wing carries a lug L for holding a pull P, which is omitted in Fig. 1 but shown in Fig. 2. The lug L comprises a rail 12 extending longitudinally of the slider, a web 14 extending longitudinally of the rail between the rail and the wing, and stops 16 and 18 at the ends of the lug, one of said stops being located on one side of the web 14, and the other of said stops being located on the other side of the web, as is most clearly shown in Fig. 2. The pull P may be stamped out of heavy gauge sheet metal, and has spaced arms or branches 20 with inturned ends or trunnions 22. The arms 20 are initially divergent, and the pull is applied to the lug by squeezing the arms toward one another, thereby bringing the trunnions up to the web 14 beneath the rail 12. The ends of the trunnions are slidable along the web. The pull is held against upward movement by the rail 12. When closing the slide fastener, the pull bears against end stop 16, as shown in broken lines in Fig. 2, and when opening the slide fastener, the pull bears against end stop 18, as shown in solid lines.

On reflection, it will be seen that a lug of the configuration here shown may be molded without the use of movable cores. The mold opens on a parting plane transverse of the lug, and by eliminating one side of one end stop, and the opposite side of the other end stop, the way is cleared for passage of fixed cores extending in opposite directions longitudinally of the lug.

The nature of the mold at the lug will be understood from inspection of Fig. 3. The die portions 24 and 26 are separable on a parting plane 28 extending transversely of the lug. The die portions have cavities for forming the outer sides of the rail and end stops, and fixed cores 30 and 32 which extend longitudinally of the lug for defining the sides of the web, the bottom of the rail, and the inner sides of the stops. The core 30 passes alongside the cavity 16' which forms the end stop 16, and runs as far as cavity 18' which forms the end stop 18. Similarly, the core 32 passes in opposite direction alongside the cavity 18' to the cavity 16'.

The invention is most conveniently applicable to a mold of the character disclosed in the co-pending application of Frederick Ulrich, previously referred to. It forms the slider body in a manner understandable from the small-scale simplified schematic view of Fig. 4. The mold portion 24 has a cavity 33 and cores 34 projecting through said cavity, and the mold portion 26 has a cavity 35 and an oppositely directed core 36 projecting through that cavity. The cores 34 and 36 fit together to define the interior of the slider. The neck of the slider is formed in a cavity 37, defined between the base ends of cores 34 and the free end of core 36. Metal flows to the wings of the slider through appropriate gate passages 38. Such a mold opens on a parting plane transverse of the slider, and thus is ideally suited for use with the present invention, inasmuch as in most sliders the lug extends longitudinally of the slider.

Considering the mold in greater detail, and referring to Figs. 3, 5, 6 and 7, the mold portion 24 is the cover die, and portion 26 is the ejector die, it having ejector pins 40 and 41 which act on gate metal and overflow metal, respectively. The cores 34 and 36 function as though made integral with the die body, but for convenience are made of separate pieces of metal fixedly secured in the die. The same applies to the cores 30 and 32. This is merely for structural convenience, cores 30 and 34 being immovable, and cores 32 and 36 being immovable relative to the ejector die 26, although, of course, they partake of its bodily movement toward and away from the cover die 24.

The projections 50 and 52 in Fig. 3, and 54 in Figs. 5 and 6, help lock the parts in proper position. The top and bottom of the mold cavity may be defined by separate pieces, as indicated at 56, 58, 60 and 62 in Figs. 5, 6 and 7, but all of these pieces are immovably assembled and function as though made of a solid block of metal.

An important advantage of the present invention is that the cores may be made simple in shape and adequate in strength. In fact, they may extend outside the rail and may be heavier in section than shown. This is illustrated in Fig. 8, in which the cores 64 and 66 are wider than the cores 30 and 32 in Fig. 7, yet define the same T-section for the lug.

The use of the web 14 has the advantage of providing a strong lug securely bonded to the slider body. It has the further advantage that the sliding contact between the ends of the trunnions 22 (Fig. 2) of the pull and the sides of the web, limits lateral turning movement of the pull, and thus additionally guards against any possibility of escape by the pull from the lug. When the web is used, the middle region of the lug has a transverse section which is T-shaped, and the end regions of the lug have sections which are inverted L-shaped, with the L at one end directed oppositely to the L at the other end.

It is believed that the configuration of the slider lug, as well as the construction of the mold for forming the slider and lug, and the advantages thereof, will be apparent from the foregoing detailed description. The slider body and lug are formed in a single operation in a simple two-part mold requiring no movable cores. The lug is normal in appearance when viewed in plan, because of the rectangular shape of the rail, and when viewed in elevation, because of the rectangular shape of the web. The lug is sturdy, and is strongly secured to the slider body. The pull is readily attached to the lug. The fixed cores employed in the mold are simple in shape, and adequate in dimension to stand up under long-continued operation of the mold.

The term "molding" is intended to include both die-casting with molten metal, and molding with any plastic materials. In special cases, a lug may be provided on both the top and bottom wings, for two pulls.

It will be understood that while I have shown and described my invention in preferred forms, changes may be made in the slider and mold structures, without departing from the spirit of the invention as sought to be defined in the following claims.

I claim:

1. A mold for a slider having a lug for holding a pull, said lug including a rail and a single web of substantial thickness both disposed on the center plane of the slider, and two offset end stops one of which is located on one side only of the web at one end of the rail and the other of which is located on the other side only of the web at the other end of the rail, said mold comprising die portions separable on a parting plane transverse of the lug, cavities in said mold portions for forming the outer sides of the rail and end stops, and two fixed cores extending longitudinally of the lug and separated from one another by the thickness of the web for defining the sides of the web, one of said cores being offset from the center plane of the rail and passing alongside one of said stops to the other stop, and the other core being offset in opposite direction from the center plane and passing in opposite direction alongside the second stop to the first stop, whereby the resulting slider has only one web and one rail and two end stops, with the rail and web on the center plane, and the end stops offset from the center plane.

2. A mold for a slider having flanged wings joined by a neck, and a lug for holding a pull, said lug including a rail and a single web of substantial thickness both disposed on the center plane of the slider, and two offset end stops one of which is located on one side only of the web at one end of the rail and the other of which is located on the other side only of the web at the other end of the rail, said mold comprising die portions separable on a parting plane transverse of the longitudinal axis of the slider and located at the widest part of the slider, cavities in said mold portions for forming the outer sides of the slider body, rail, and end stops, two fixed cores projecting through said cavities for defining the interior of the slider body, and two fixed cores extending longitudinally of the lug and separated from one another by the thickness of the web for defining the sides of the web, one of said cores being offset from the center plane of the rail and passing alongside one of said stops to the other stop, and the other core being offset in opposite direction from the center plane and passing in opposite direction alongside the second stop to the first stop, whereby the resulting slider has only one web and one rail and two end stops, with the rail and web on the center plane, and the end stops offset from the center plane.

References Cited in the file of this patent

UNITED STATES PATENTS

| Number | Name | Date |
|---|---|---|
| 2,264,144 | Thoresen | Nov. 25, 1941 |
| 2,374,292 | Kuna | Apr. 24, 1945 |
| 2,487,359 | Natzler | Nov. 8, 1949 |
| 2,509,278 | Scheuermann et al. | May 30, 1950 |